United States Patent
Rondeau et al.

(10) Patent No.: US 9,215,419 B2
(45) Date of Patent: Dec. 15, 2015

(54) SYSTEM AND METHOD FOR SET-TOP BOX RECORDING

(75) Inventors: David Rondeau, Olathe, KS (US); David Emerson, Overland Park, KS (US); Gary Lafreniere, Olathe, KS (US); Mike Goergen, Bend, OR (US)

(73) Assignee: CenturyLink Intellectual Property LLC, Denver, CO (US)

(*) Notice: Subject to any disclaimer, the term of this patent is extended or adjusted under 35 U.S.C. 154(b) by 608 days.

(21) Appl. No.: 12/347,414

(22) Filed: Dec. 31, 2008

(65) Prior Publication Data

US 2010/0169944 A1  Jul. 1, 2010

(51) Int. Cl.
| | | |
|---|---|---|
| *H04N 21/41* | (2011.01) | |
| *H04N 7/173* | (2011.01) | |
| *H04N 21/4147* | (2011.01) | |
| *H04N 21/433* | (2011.01) | |
| *H04N 21/442* | (2011.01) | |
| *H04N 21/443* | (2011.01) | |
| *H04N 21/4788* | (2011.01) | |
| *H04N 21/81* | (2011.01) | |

(52) U.S. Cl.
CPC ........... *H04N 7/173* (2013.01); *H04N 21/4147* (2013.01); *H04N 21/4334* (2013.01); *H04N 21/443* (2013.01); *H04N 21/44209* (2013.01); *H04N 21/44245* (2013.01); *H04N 21/4788* (2013.01); *H04N 21/8106* (2013.01)

(58) Field of Classification Search
None
See application file for complete search history.

(56) References Cited

U.S. PATENT DOCUMENTS

| | | | |
|---|---|---|---|
| 5,831,664 A | 11/1998 | Wharton et al. | |
| 6,684,240 B1 | 1/2004 | Goddard | |
| 6,810,506 B1* | 10/2004 | Levy | 716/104 |
| 6,810,526 B1* | 10/2004 | Menard et al. | 725/46 |
| 7,478,414 B1 | 1/2009 | Glusker et al. | |
| 7,571,458 B1* | 8/2009 | Eyal | 725/137 |
| 7,643,564 B2 | 1/2010 | Sheynman | |
| 7,870,279 B2 | 1/2011 | Chuang et al. | |
| 8,253,558 B2 | 8/2012 | Emerson et al. | |
| 8,260,363 B2 | 9/2012 | Roberts et al. | |
| 8,286,215 B2 | 10/2012 | Daniels | |
| 8,312,500 B2 | 11/2012 | Emerson et al. | |
| 8,316,399 B1 | 11/2012 | Nush | |
| 8,467,275 B2 | 6/2013 | Emerson et al. | |

(Continued)

FOREIGN PATENT DOCUMENTS

EP   1650927 A2   4/2006

OTHER PUBLICATIONS

Parchomovsky, Gideon et al., "Fair Use Harbors"; 93 Va. L. Rev. 1483 (2007).

(Continued)

*Primary Examiner* — Cai Chen
(74) *Attorney, Agent, or Firm* — Swanson & Bratschun, L.L.C.

(57) ABSTRACT

Embodiments of the present invention disclose an integrated set-top box for recording a voice communication and/or a voicemail. In one embodiment, the integrated set-top box automatically detects communications associated with a monitored communication line and records and stores the voice communications in a data storage unit of the integrated set-top box. In another embodiment, the integrated set-top box may provide voicemail capabilities in addition to other features.

14 Claims, 5 Drawing Sheets

(56) References Cited

U.S. PATENT DOCUMENTS

| | | |
|---|---|---|
| 8,478,598 B2 | 7/2013 | Burckart et al. |
| 8,627,377 B2 | 1/2014 | LaFreniere et al. |
| 8,627,399 B2 | 1/2014 | White et al. |
| 8,731,620 B2 | 5/2014 | Roberts et al. |
| 8,756,646 B2 | 6/2014 | LaFreniere et al. |
| 8,789,113 B2 | 7/2014 | Goergen et al. |
| 8,856,855 B2 | 10/2014 | Goergen et al. |
| 9,106,976 B2 | 8/2015 | Emerson et al. |
| 9,167,206 B2 | 10/2015 | Goergen et al. |
| 2001/0021994 A1 | 9/2001 | Nash |
| 2002/0083468 A1 | 6/2002 | Dudkiewicz |
| 2002/0100044 A1 | 7/2002 | Daniels |
| 2002/0124252 A1 | 9/2002 | Schaefer et al. |
| 2002/0129368 A1 | 9/2002 | Schlack et al. |
| 2002/0147986 A1* | 10/2002 | Michael et al. ............... 725/110 |
| 2002/0188944 A1 | 12/2002 | Noble |
| 2002/0188949 A1 | 12/2002 | Wang et al. |
| 2002/0188959 A1 | 12/2002 | Piotrowski |
| 2003/0005448 A1 | 1/2003 | Axelsson et al. |
| 2003/0018977 A1 | 1/2003 | McKenna |
| 2003/0066069 A1 | 4/2003 | Mankovich |
| 2003/0128820 A1* | 7/2003 | Hirschberg et al. ......... 379/88.14 |
| 2003/0194966 A1* | 10/2003 | Fellenstein et al. .......... 455/3.01 |
| 2003/0208777 A1 | 11/2003 | Danker et al. |
| 2004/0019807 A1 | 1/2004 | Freund |
| 2004/0049785 A1 | 3/2004 | Grzeczkowski et al. |
| 2004/0203651 A1* | 10/2004 | Qu et al. ..................... 455/414.1 |
| 2006/0020993 A1* | 1/2006 | Hannum et al. ............... 725/111 |
| 2006/0184989 A1 | 8/2006 | Slothouber |
| 2006/0212894 A1 | 9/2006 | Knudson et al. |
| 2006/0253886 A1 | 11/2006 | Khurana et al. |
| 2007/0079345 A1 | 4/2007 | McEnroe |
| 2007/0079353 A1 | 4/2007 | Boortz |
| 2007/0121651 A1 | 5/2007 | Casey et al. |
| 2007/0150273 A1 | 6/2007 | Yamamoto et al. |
| 2007/0220554 A1 | 9/2007 | Barton et al. |
| 2007/0280445 A1* | 12/2007 | Shkedi ........................ 379/93.23 |
| 2007/0280446 A1* | 12/2007 | Hsieh et al. ................. 379/93.23 |
| 2008/0059992 A1 | 3/2008 | Amidon et al. |
| 2008/0107244 A1* | 5/2008 | Setzer et al. ............... 379/88.12 |
| 2008/0115164 A1 | 5/2008 | Kiiskinen |
| 2008/0134043 A1 | 6/2008 | Georgis et al. |
| 2008/0301732 A1 | 12/2008 | Archer et al. |
| 2009/0069038 A1 | 3/2009 | Olague et al. |
| 2009/0133069 A1 | 5/2009 | Conness et al. |
| 2009/0133070 A1 | 5/2009 | Hamano et al. |
| 2009/0150925 A1 | 6/2009 | Henderson |
| 2009/0158382 A1 | 6/2009 | Shaffer et al. |
| 2009/0164559 A1 | 6/2009 | Johnson et al. |
| 2009/0217324 A1 | 8/2009 | Massimi |
| 2009/0228929 A1 | 9/2009 | Cass |
| 2009/0249387 A1 | 10/2009 | Magdy et al. |
| 2009/0249451 A1 | 10/2009 | Su et al. |
| 2009/0265737 A1 | 10/2009 | Issa et al. |
| 2009/0293079 A1 | 11/2009 | McKee et al. |
| 2009/0300695 A1 | 12/2009 | White et al. |
| 2010/0058395 A1 | 3/2010 | Goergen et al. |
| 2010/0058415 A1 | 3/2010 | Goergen et al. |
| 2010/0058417 A1 | 3/2010 | Rondeau et al. |
| 2010/0064325 A1 | 3/2010 | Fishman et al. |
| 2010/0125884 A1 | 5/2010 | Howcroft |
| 2010/0149302 A1 | 6/2010 | Malik |
| 2010/0251325 A1 | 9/2010 | Gupta |
| 2010/0261466 A1 | 10/2010 | Chang et al. |
| 2011/0126251 A1 | 5/2011 | LaFreniere et al. |
| 2011/0126257 A1 | 5/2011 | Goergen et al. |
| 2011/0131604 A1 | 6/2011 | Van Hoff et al. |
| 2011/0270952 A1 | 11/2011 | Ray et al. |
| 2012/0018510 A1 | 1/2012 | Gardner |
| 2012/0223134 A1 | 9/2012 | Smith et al. |
| 2012/0223135 A1 | 9/2012 | Meek et al. |
| 2012/0233638 A1 | 9/2012 | Slaney et al. |
| 2012/0317599 A1 | 12/2012 | Emerson et al. |
| 2012/0324003 A1 | 12/2012 | Armstrong et al. |
| 2013/0031590 A1 | 1/2013 | Ivanov et al. |
| 2013/0241726 A1 | 9/2013 | Hunter et al. |
| 2013/0305275 A1 | 11/2013 | Emerson et al. |
| 2014/0053190 A1 | 2/2014 | Sirpal |
| 2014/0074621 A1 | 3/2014 | Chai et al. |
| 2014/0130093 A1 | 5/2014 | Goergen et al. |
| 2014/0259081 A1 | 9/2014 | Chatterjee |
| 2014/0282705 A1 | 9/2014 | Chatterjee et al. |

OTHER PUBLICATIONS

U.S. Appl. No. 12/201,249; Notice of Allowance dated Mar. 14, 2014; 31 pages.

U.S. Appl. No. 12/201,313; NonFinal Office Action dated Mar. 26, 2014; 10 pages.

U.S. Appl. No. 12/201,313; Final Office Action dated Oct. 23, 2014; 11 pages.

U.S. Appl. No. 12/201,313; Final Office Action dated Feb. 27, 2015; 11 pages.

U.S. Appl. No. 14/152,696; Notice of Publication dated May 8, 2014; 1 page.

U.S. Appl. No. 12/201,273; NonFinal Office Action dated Apr. 10, 2014; 35 pages.

U.S. Appl. No. 12/201,273; Final Office Action dated Oct. 27, 2014; 38 pages.

U.S. Appl. No. 12/201,273; Notice of Allowance dated Mar. 16, 2015; 28 pages.

U.S. Appl. No. 12/201,436; Final Office Action dated Apr. 25, 2014; 30 pages.

U.S. Appl. No. 13/750,537; Notice of Allowance dated Jan. 10, 2014; 11 pages.

U.S. Appl. No. 13/910,706; Notice of Allowance dated Mar. 26, 2015; 30 pages.

U.S. Appl. No. 13/567,367; NonFinal Office Action dated Jan. 30, 2014; 17 pages.

U.S. Appl. No. 13/567,367; Final Office Action dated Jul. 23, 2014; 14 pages.

U.S. Appl. No. 12/625,744; Notice of Allowance dated Feb. 5, 2014; 26 pages.

U.S. Appl. No. 12/625,762; Notice of Allowance dated Jun. 3, 2014; 18 pages.

U.S. Appl. No. 13/787,371; NonFinal Office Action dated Apr. 9, 2014; 30 pages.

U.S. Appl. No. 13/787,371; Final Office Action dated Aug. 22, 2014; 32 pages.

U.S. Appl. No. 13/787,371; Notice of Publication dated Sep. 11, 2014; 1 page.

U.S. Appl. No. 13/787,371; NonFinal Office Action dated Mar. 5, 2015; 40 pages.

U.S. Appl. No. 13/962,531; Notice of Publication dated Sep. 19, 2014; 1 page.

U.S. Appl. No. 13/962,531; NonFinal Office Action dated Dec. 18, 2014; 47 pages.

U.S. Appl. No. 12/201,313; NonFinal Office Action dated Jul. 1, 2015; 19 pages.

U.S. Appl. No. 14/152,696; NonFinal Office Action dated Aug. 21, 2015; 26 pages.

U.S. Appl. No. 13/567,367; NonFinal Office Action dated Jun. 10, 2015; 21 pages.

U.S. Appl. No. 13/787,371; Final Office Action dated Jul. 30, 2015; 50 pages.

U.S. Appl. No. 13/962,531; Final Office Action dated Jun. 19, 2015; 30 pages.

US 9,083,851, 07/2015, Goergen et al. (withdrawn)

* cited by examiner

SYSTEM AND METHOD FOR SET-TOP BOX RECORDING

BACKGROUND OF THE INVENTION

A set-top box (STB) is a device that connects a television to an external signal source. The set-top box decodes the signal into content which is then displayed on the television screen. Many improvements have been made recently in the functionality provided through a user's integrated set-top box. For example, many of today's set-top boxes are also digital video recorders (DVRs). A digital video recorder (DVR) is a device that records video in a digital format to a disk drive or other memory medium within a device.

SUMMARY OF THE INVENTION

Embodiments of the present invention include a set-top box that comprises a memory component for storing computer executable instructions, a data storage unit for storing recorded voice communications and recorded media content files; a line monitoring module for detecting a connected call on a communication line; and a processing unit for executing the computer executable instructions to record voice communications in response to detecting the connected call.

Further details and advantages of the present invention will be discussed in the following detailed description of the preferred embodiments.

DETAILED DESCRIPTION OF THE DRAWINGS

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented.

Embodiments of the present invention include an integrated set-top box for recording voice communications on the integrated set-top box. In addition, the integrated set-top box provides video signal decoding capabilities for displaying a television program on a display unit. As will be further described, in one embodiment, the integrated set-top box automatically detects, records, and stores communications associated with a monitored communication device in a data storage unit of the integrated set-top box. In another embodiment, the integrated set-top box may provide, in addition to other features, voicemail capabilities. With the advent of virtually unlimited data storage capacity, e.g., a terabyte hard drive, the disclosed embodiments may store year's worth of conversations and/or voicemails.

Figure 1:
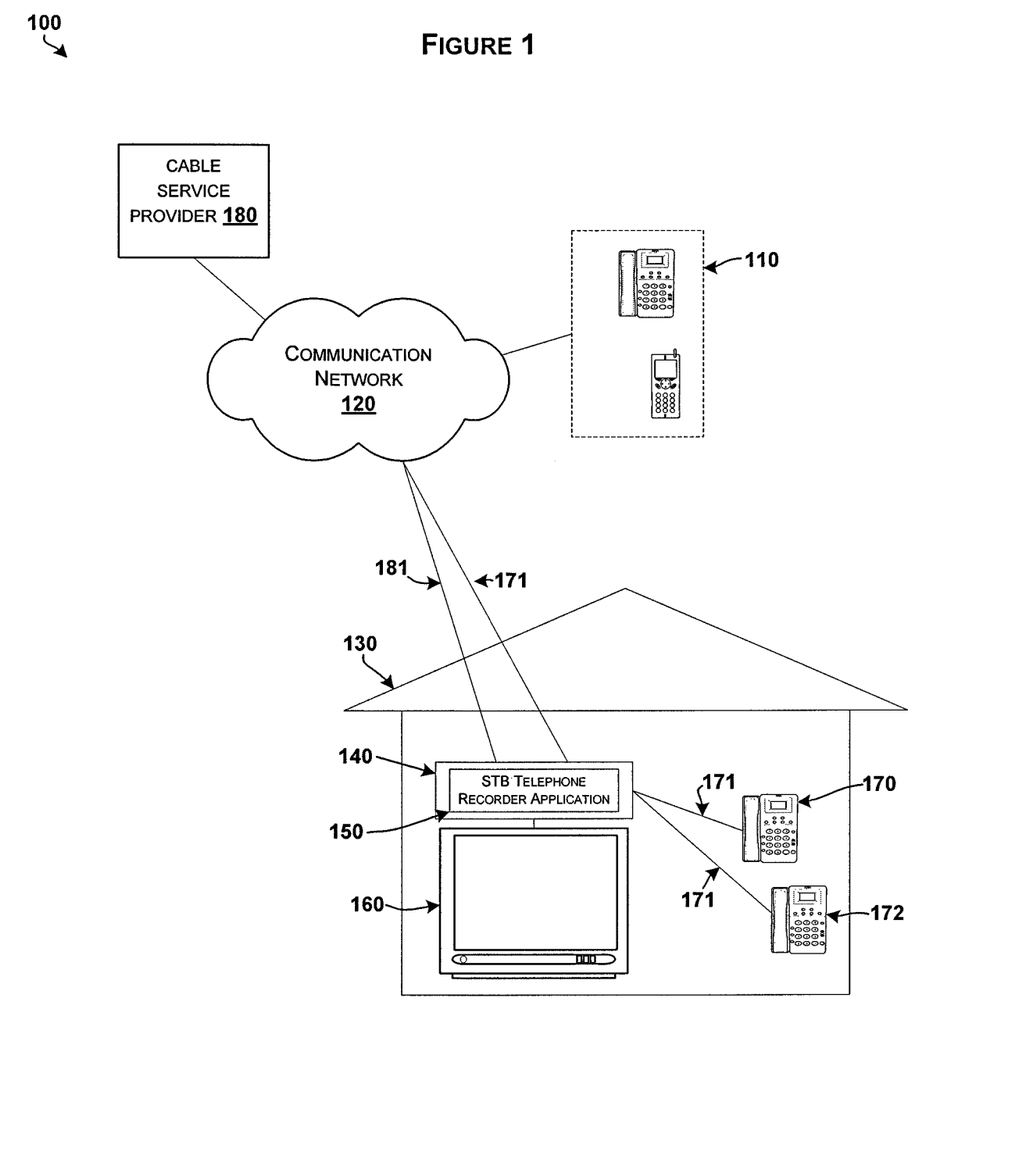
FIG. 1 depicts an exemplary environment for in which the illustrative embodiments may be implemented for recording voice communications on a set-top box.

FIG. 1 depicts an exemplary environment 100 in which the illustrative embodiments may be implemented for recording voice communications and/or a voicemail on a set-top box. In the depicted embodiment, a set-top box 140 is located in a residential location 130. In one embodiment, set-top box 140 is an integrated set-top box that decodes television signals, records digital media content, and records voice communications and/or voicemails in accordance with the disclosed embodiments.

For example, in the depicted embodiment, set-top box 140 is communicatively coupled to a display unit 160, network 120, and communication device 170. Set-top box 140 is configured to receive television signals 181 from a cable service provider 180 for displaying television programming on display unit 160. In addition, in one embodiment, set-top box 140 is configured to monitor voice communications associated with communication line 171. Communication line 171 may be, but is not limited to, a standard telephone line, a fiber-optic line, and/or a coaxial cable. In one embodiment, communication line 171 is routed through set-top box 140 for enabling set-top box 140 to monitor and record voice communications associated with a communication device, such as, communication device 170, coupled to communication line 171.

For example, in one embodiment, set-top box 140 executes instructions associated with a set-top box voice communication recording application 150 for recording voice communications and/or voicemails associated with communication device 170. Communication device 170 may be, but is not limited to, an analog phone, voice over IP phone, or a data processing system, such as, a personal computer, capable of receiving and calling a plurality of communication devices 110 over network 120. Communication devices 110 include, but are not limited to, a regular landline phone, a mobile phone, a VOIP phone, and/or a data processing system.

In some embodiments, set-top box 140 may monitor the voice communications associated with more than one communication device connected to a single communication line. For example, in one embodiment, communication device 170 and communication device 172 may be connected to communication line 171. Additionally, in some embodiments, set-top box 140 may monitor voice communications associated with more than one communication device connected to a plurality of separate communication lines.

In one embodiment, network 120 may include one or more satellite and/or cable networks for transmitting media content. Additionally, in some embodiments, network 120 may also include a cellular network, the public switched telephone network (PSTN), and the Internet for connecting communication device 170 to the plurality of communication devices 110. In some embodiments, the cellular network may include a 3G network. 3G networks are wide-area cellular telephone networks that incorporate high-speed Internet access. In some embodiments, network 120 may also include a number of different types of data networks, such as, but not limited to, an intranet, a local area network (LAN), a wide area network (WAN), and wireless local area network (WLAN) networks.

Figure 2:
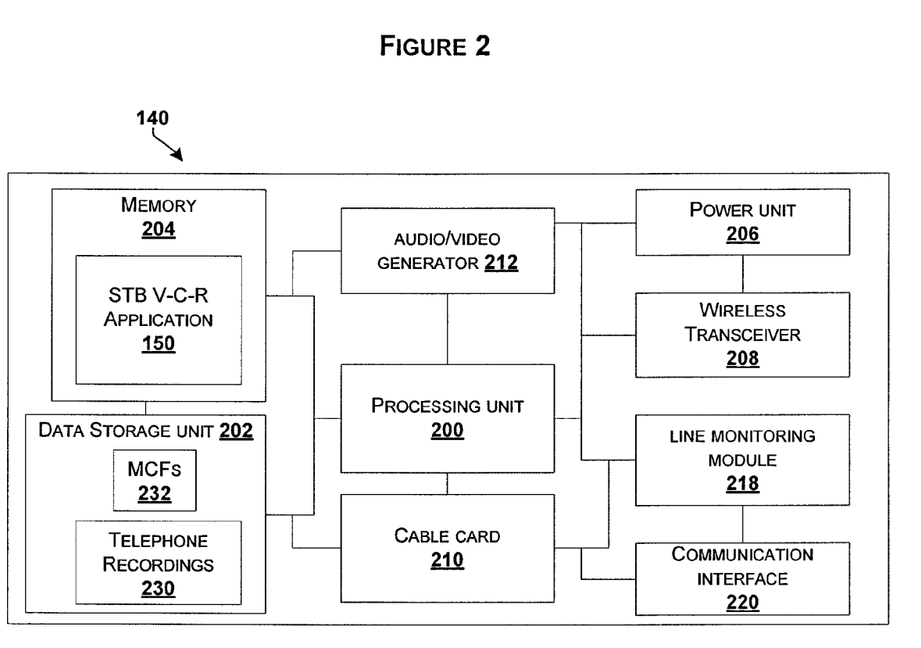
FIG. 2 illustrates one embodiment of set-top box in accordance with the disclosed embodiments.

FIG. 2 illustrates one embodiment of set-top box 140 in accordance with the disclosed embodiments. In the depicted embodiment, set-top box 140 includes, but is not limited to, a processing unit 200, a data storage unit 202, a memory component 204, a power unit 206, a wireless transceiver 208, a cable card interface 210, an audio/video generator 212, a line monitoring module 218, and a communication interface 220.

Processing unit 200 may comprise of one or more microprocessors for executing computer usable program code/instructions for recording voice communications and voicemails. In one embodiment, processing unit 202 may execute computer executable instructions associated with set-top box voice communication recording application 150 stored in memory component 204 for recording voice communications and voicemails associated with communication device 170.

Memory component 204 is a data storage component of set-top box 140. In some embodiments, memory component 204 includes volatile memory. Volatile memory is memory that loses its contents when the computer or hardware device loses power. For example, in some embodiments, memory component 154 may be random access memory (RAM). Random access memory stores currently executing instructions and/or data utilized by an operating system, software program, hardware device, and/or a user.

Data storage unit 202 is a non-volatile memory component of set-top box 140, such as, but not limited to, a hard disk drive. Non-volatile memory retains stored data when power is loss. In some embodiments, data storage unit 202 may be an external hard drive and/or a network data storage unit. In one embodiment, data storage unit 202 stores voice communications 230. Voice communications 230 may include recorded voice communications and voicemails associated with communication device 170. In addition, in some embodiments, data storage unit 202 may store other data, such as, but not limited to, recorded media content files 232.

In some embodiments, line monitoring module 218 includes a line voltage detector used to monitor the voltage level traveling through communication line 171. For example, in one embodiment, line monitoring module 218 may determine whether communication device 170 is off the hook, whether an incoming call is being received, or whether communication device 170 is initiating an outbound call. For example, in some embodiments, line monitoring module 218 determines that the handheld receiver of communication device 170 is off the hook when it detects direct current (DC) flowing through communication line 171. Additionally, in some embodiments, line monitoring module 218 is configured to detect a dial tone frequency indicating that the receiving end is ready to receive dial pulses or DTMF signals. For example, in one embodiment, the dial tone frequency is a combination of 350-hertz tone and a 440-hertz tone held steady at −13 dBm0/frequency.

In addition, in some embodiments, line monitoring module 218 is also configured to interpret the dial pulses or DTMF signals to determine the caller ID information associated with an outbound call. Further, in some embodiments, line monitoring module 218 is also configured to detect the audible ring back frequency, i.e., the ringing sound that a caller hears when placing a call. Once the audible ring back frequency is no longer detected, line monitoring module 218 determines that a call has been answered. Moreover, in some embodiments, line monitoring module 218 is configured to detect a ring voltage for determining that an incoming call is being received. Likewise, in some embodiments, line monitoring module 218 is also configured to determine the caller id information associated with an incoming call over communication line 171.

In one embodiment, line monitoring module 218 may include an analogue terminal adapter (ATA). The analogue terminal adapter enables communication device 170 to communicate directly with a VoIP server using a VoIP protocol, such as, H.323, SIP, MGCP, or IAX, and encodes and decodes the voice signal using a voice codec, such as, ULAW, ALAW, GSM, ILBC and others.

Communication interface 220 provides connection ports for coupling set-top box 140 to one or more electronic devices. For example, in one embodiment, communication interface 220 includes a video output interface, such as, but not limited to, a coaxial cable connection for coupling set top box 140 to display unit 160. Additionally, in some embodiments, communication interface 220 includes, but is not limited to, a RJ45 Ethernet port and/or a RJ11 telephone line port for communicatively coupling set top box 140 to communication line 171 for monitoring voice communications associated with communication device 170. Further, in some embodiments, communication interface 220 may include other connector ports, such as, but not limited to, a 1394 port, a universal serial bus (USB) port, and/or a high-definition multimedia interface (HDMI).

Cable card 210 is a plug-in cable/smart card that enables viewing and/or recording of cable television programming. For example, in some embodiments, cable card 210 comprises instructions and/or a decryption key for decoding encrypted cable television signals transmitted by a cable provider.

Audio/video generator 212 may receive media signals through communication interface 220 and generate the appropriate audio and/or video output for transmission to display unit 160. In some embodiments, audio/video generator 212 uses a decryption key provided by cable card 210 to decode the received media signals.

Wireless transceiver 208 provides short-range exchange of data using, but not limited to, infrared light. For example, wireless transceiver 208 enables a user using a remote control device to operate and configure set top box 140. Additionally, in some embodiments, wireless transceiver 208 enables a user using a remote control device to record, playback, search, and/or send a recorded voice communication and/or voicemail associated with communication device 170.

Finally, power unit 206 converts the input power from an AC adaptor to run various components of set-top box 140. In some embodiments, power unit 202 may include an internal power source, such as, but not limited to, a battery component.

Figure 3:
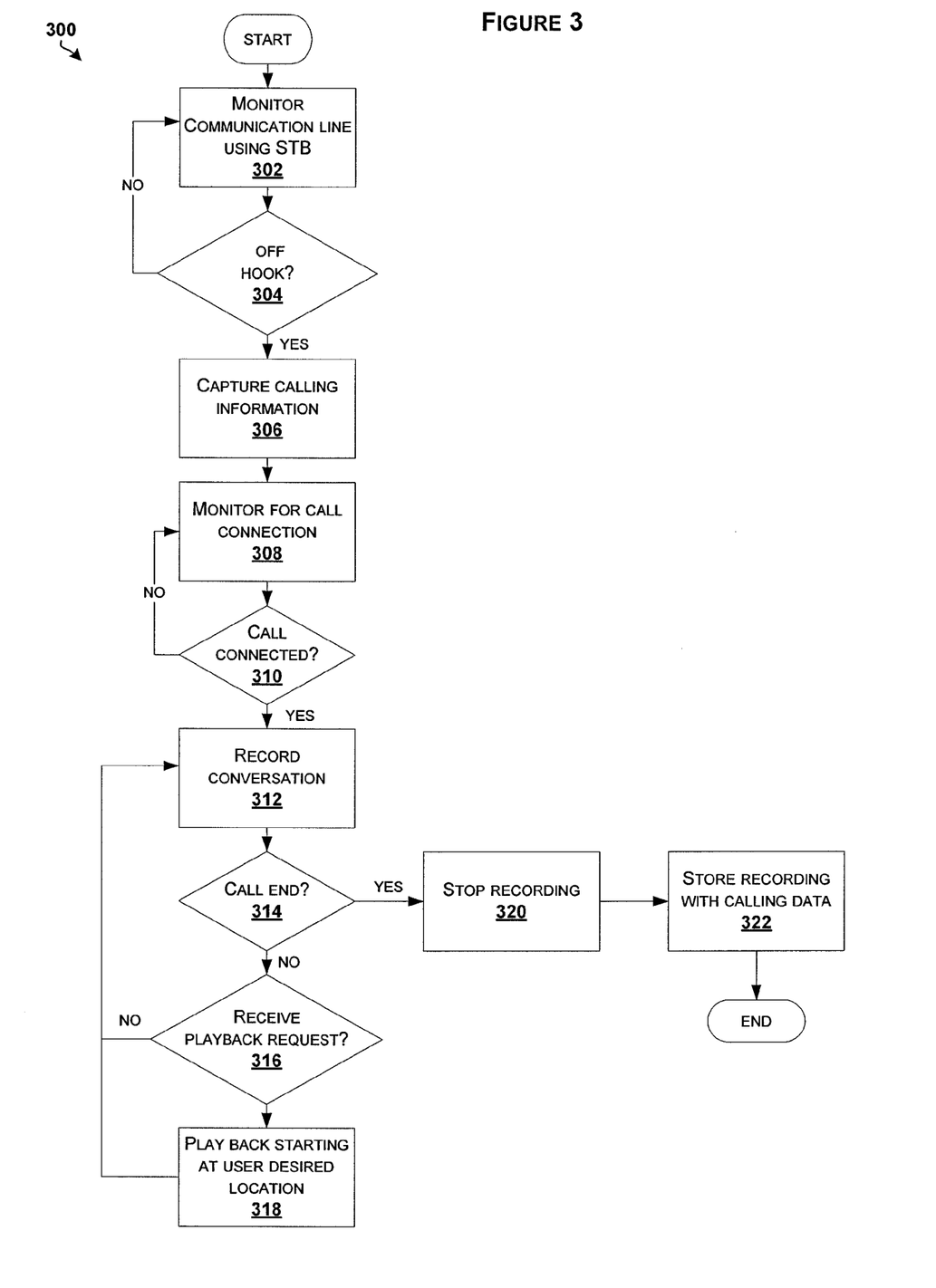
FIG. 3 depicts a flow chart illustrating an embodiment of a method for recording an outbound voice communication call on a set-top box in accordance with the disclosed embodiments.

With reference now to FIG. 3, an embodiment of a process 300 is presented for recording an outbound voice communication call on a set-top box in accordance with the disclosed embodiments. In one embodiment, process 300 is executed by a set-top box, such as, set-top box 140. In some embodiments, process 300 may be computer executable instructions associated with a software application, such as, but not limited to, set-top box voice communication recording application 150. Process 300 may be executed by one or more processors, such as, processing unit 200. Alternatively, in some embodiments, process 300 may be executed by a hardware embodiment or a combination of hardware and software.

Process 300 begins, at step 302, by monitoring the communication line associated with one or more monitored communication devices. At step 304, the process determines whether a monitored communication device is off the hook. If the process determines that a monitored communication device is off the hook, the process captures the calling information at step 306. For example, in one embodiment, the process is able to determine the outbound call number by deciphering the dial pulses for a rotary telephone or DTMF signals for a touch-tone telephone.

At step 308, the process monitors for call connection. For example, in one embodiment, once the process no longer detects the audible ring back frequency, the process, at step 310, determines that the call is connected. At step 312, process begins recording of the voice communication associated with the monitored communication device. Additionally, in some embodiments, the process logs the beginning time and maintains a timer for monitoring the length of the call. Alternatively, in some embodiments, the process logs the ending time of the call and determines the difference between the ending time and the beginning time to determine the length of the call.

At step 314, the process monitors for the end of the call. If the call has not ended, the process continues to record the conversation at step 312. In some embodiments, the process may receive a request to playback some or a portion of the recorded conversation at step 316. In these embodiments, the process, at step 318, plays the recorded conversation starting from a user specified location. Once the process detects, at step 314, that a call has ended, the process stops recording at step 320. The process, at step 322, stores the recording along with the calling data, such as, but not limited to, the caller ID information, the time of the call, and the length of the call in data storage unit 202, with process 300 terminating thereafter.

Figure 4:
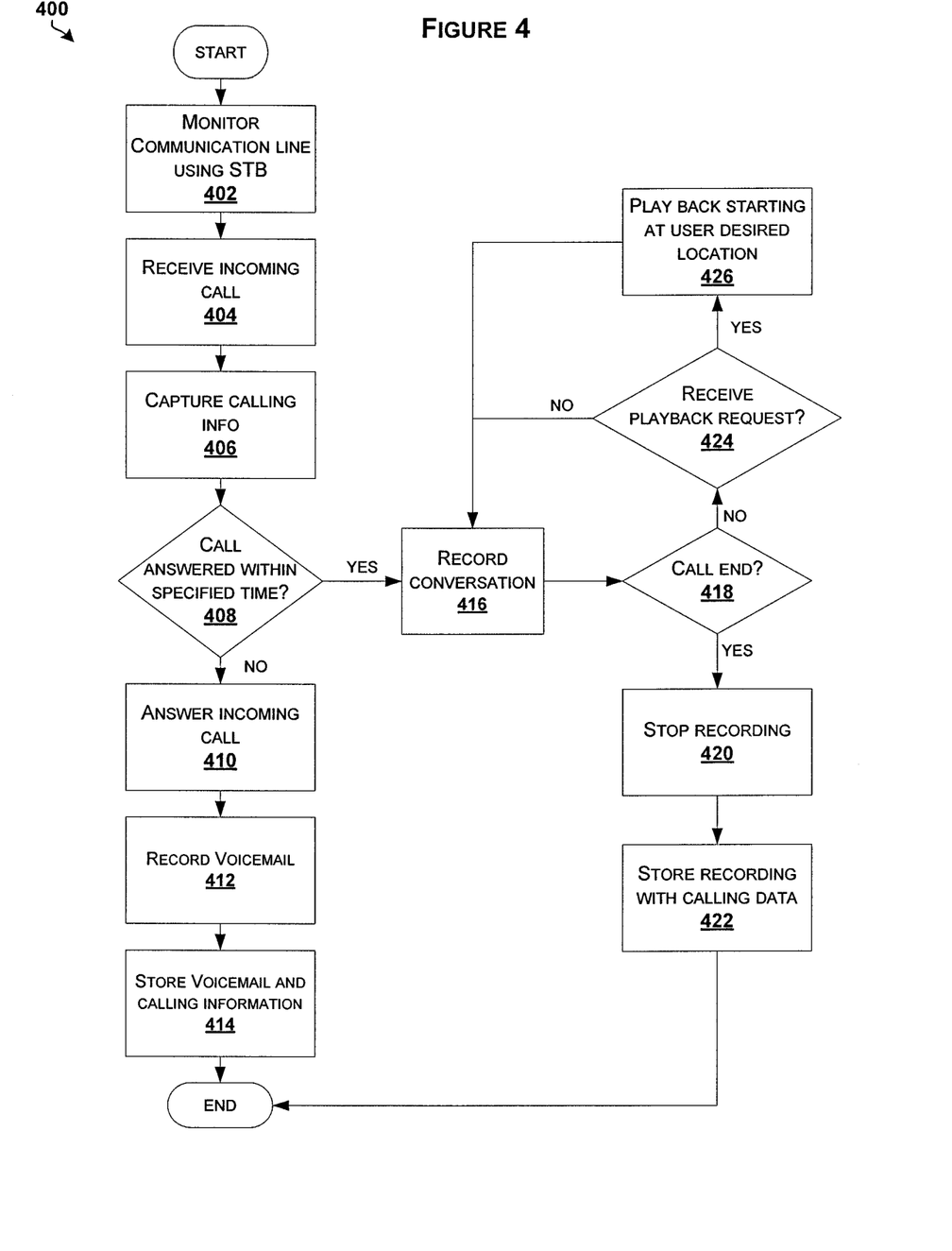
FIG. 4 depicts a flow chart illustrating an embodiment of a method for recording an inbound voice communication call or a voicemail on a set-top box in accordance with the disclosed embodiments.

Process 400 depicts an embodiment of a process for recording an inbound voice communication call and/or a voicemail on a set-top box in accordance with the disclosed embodiments. In one embodiment, process 400 is executed by a set-top box, such as, set-top box 140. In some embodiments, process 400 may be computer executable instructions associated with a software application, such as, but not limited to, set-top box voice communication recording application 150. Process 400 may be executed by one or more processors, such as, processing unit 200. Alternatively, in some embodiments, process 400 may be executed by a hardware embodiment or a combination of hardware and software.

Process 400 begins, at step 402, by monitoring the communication line associated with one or more monitored communication devices. At step 404, the process detects an incoming call over the monitored communication line. For example, in one embodiment, line monitoring module 218 is configured to detect a ring voltage for determining that an incoming call is being received. For instance, in one embodiment, the "ring" signal is a 90-volt AC wave at 20 hertz (Hz).

At step 406, the process captures the calling information, such as, but not limited to, the caller ID, and the time of the call. For instance, the phone company uses frequency shift keying technique to send ASCII character data over communication line 171 to communication device 170 for identifying the caller. In one embodiment, the process decodes the ASCII characters to determine the caller identification.

In some embodiments, the process determines whether the incoming call is answered within a specified time period at step 408. For example, in one embodiment, the process determines whether the call is answered within a specified number of rings. If the call is not answered within the specified time period, the process answers the incoming call and plays a recorded message at step 410. At step 412, process records a voicemail. The process, at step 414, stores the recorded voice mail and the respective calling information, such as, but not limited to, the caller ID, call time, and/or the length of the voicemail message in data storage unit 202.

However, if the call is answered within a specified time period at step 408, the process records the conversation at step 416. At step 418, the process monitors for the end of the call. If the call has not ended, the process continues to record the conversation at step 416. In some embodiments, the process may receive a request to playback some or a portion of the recorded conversation at step 424. In these embodiments, the process, at step 426, plays the recorded conversation starting from a user specified location. In some embodiments, the process continues to record the live conversation during playback of the recorded conversation at step 416. Additionally, in some embodiments, the process may play the recorded conversation using the audio output speakers of a coupled display unit, such as, but not limited to, a television. Alternatively, or in addition to, in one embodiment, the process may play a recorded conversation over communication line 171, thus, enabling both parties to directly hear the recorded conversation.

Once the process detects, at step 418, that a call has ended, the process, at step 420, stops recording of the voice communication. The process, at step 422, stores the recording along with the calling data, such as, but not limited to, the caller ID information, the time of the call, and the length of the call in data storage unit 202, with process 400 terminating thereafter.

Figure 5A:
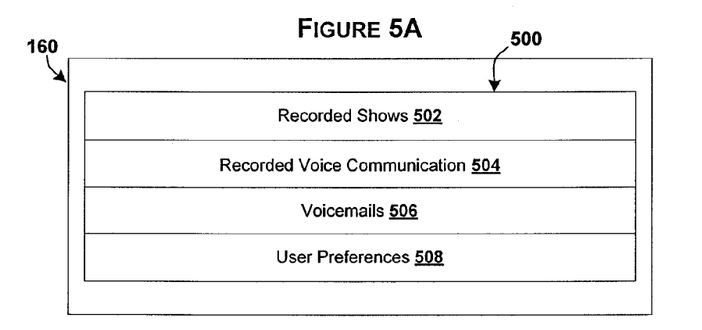
FIGS. 5A-5C depict embodiments of user interfaces in accordance with the principles of the present invention.
Figure 5B:
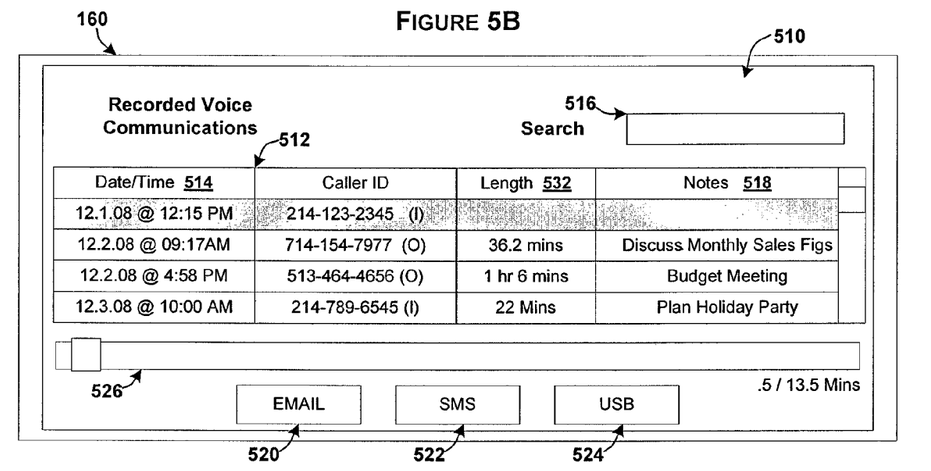
Figure 5C:
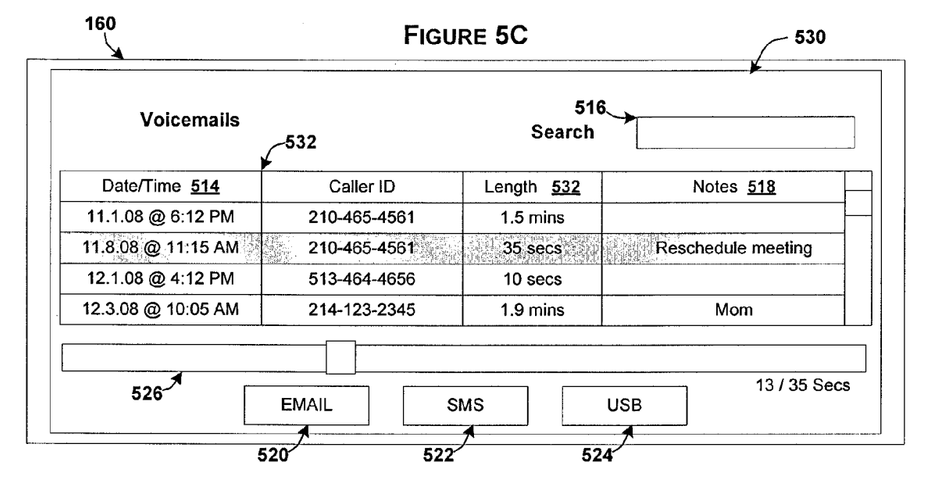

FIGS. 5A-5C depict embodiments of user interfaces in accordance with the principles of the present invention. FIG. 5A depicts a user interface 500 on display unit 160. User interface 500 displays a list of user selectable options associated with set-top box 140. For example, in the depicted embodiment, user interface 500 includes a recorded shows option 502, a recorded voice communications option 504, a voicemail option 506, and user preferences option 508.

In one embodiment, selecting recorded shows option 502 causes set-top box 140 to display a list of recorded television programs. Similarly, selecting recorded phone conversations option 504 or a voicemail option 506 causes set-top box 140 to respectively display a list of recorded phone conversations or voicemails.

User preferences option 508 may enable a user to select certain options associated with set-top box 140. For example, in one embodiment, a user may configure whether set-top box 140 automatically records every voice communication, automatically records every voice communications associated with a particular caller ID, automatically records voice communications only during a certain time of day, automatically not record voice communications associated with a particular call list (e.g., private conversations and calls from telemarketers), or only record voice communications that are manually initiated by a user. Additionally, in some embodiments, a user may configure set-top box voice communication recording application 150 to automatically notify a user of a new voicemail. For example, in some embodiments, set-top box voice communication recording application 150 may send the new voicemail to a user specified email address. In another embodiment, set-top box voice communication recording application 150 may call and/or send a text message to a user to provide notification of a new voicemail.

FIGS. 5B and 5C respectively depict a user interface 510 and a user interface 530. User interface 510 displays a list of recorded voice communications 512. User interface 530 displays a list of recorded voicemails 532. In the depicted embodiment, the list of recorded voice communications 512 and the list of recorded voicemails 532 displays the date/time, caller identification, time length, and user-specified notes associated with the recorded phone conversations or voicemails.

In some embodiments, a user may specify whether the latest or earliest voice communications/voicemails are displayed first on the list of recorded voice communications 512 and the list of recorded voicemails 532. For example, in one embodiment, by selecting the header row of date/time column 514, the list of recorded voice communications 512 alternates between displaying the earliest conversation first and displaying the latest conversation first.

In addition, in some embodiments, a user may specify that the list of recorded voice communications 512 and/or the list of recorded voicemails 532 group the recorded voice communications/voicemails by caller ID. Further, in some embodiments, a user may manually enter notes associated with a voice communication/voicemail in notes column 518. In some embodiments, text characters may be entered using character keys on a remote control device. Alternatively, or in addition to, in some embodiments, set-top box 140 may display a user selectable keyboard on display unit 160.

Additionally, in some embodiments, user interface 510 includes a search component 516 enabling a user to search for a particular voice communication and/or voicemail. For example, in some embodiments, a user may search for a particular term found in notes column 518 and/or a particular caller ID. Further, in some embodiments, set-top box voice communication recording application 150 may use speech recognition software to parse the recorded voice communications/voicemails to enable a user to search for specific terms spoken during a voice communication/voicemail.

In addition, in some embodiments, a user may transfer a recorded voice communication and/or voicemail via e-mail option 520, SMS option 522, and/or via a USB option 524. In some embodiments, a user pre-configures e-mail addresses and/or mobile identification numbers (mobile phone numbers) for sending recorded voice communications and/or voicemails. Additionally, in some embodiments, a user interface may be presented in which a user may specify an e-mail address and/or a mobile phone number for sending a particular recorded voice communication.

USB option 524 transfers a selected recorded voice communication to an attached USB memory device. In some embodiments, alternative memory devices and connector ports may be used, including, but not limited to, an external hard drive or a memory card.

In addition, in some embodiments, a user may use a standard set-top box remote control device to playback a selected recorded phone conversation or voicemail. For example, in some embodiments, similar buttons for controlling playback of a recorded media content file may be used for playing back a recorded voice communication or voicemail. In some embodiments, user interface 510 and user interface 530 may display a progress bar 526 depicting the progress of a voice communication or voicemail is being played.

Accordingly, embodiments of the present invention disclose a set-top box for recording a voice communication and/or a voicemail. In one embodiment, the set-top box comprises memory for storing computer executable instructions, a data storage unit for storing recorded voice communications and recorded media content files; a line monitoring module for detecting a connected call on a communication line; and a processing unit for executing the computer executable instructions to record a voice communication in response to detecting the connected call.

As will be appreciated by one skilled in the art, the disclosed embodiments may be embodied as a system, method, or computer program product. Accordingly, the disclosed embodiments may be implemented entirely with hardware or as a software embodiment (including firmware, resident software, micro-code, etc.) or an embodiment combining software and hardware aspects that may all generally be referred to herein as a "circuit," "module" or "system." Furthermore, the disclosed embodiments may take the form of a computer program product embodied in any tangible medium of expression having computer-usable program code embodied in the medium.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

We claim:

1. A set-top box comprising:
    memory for storing computer executable instructions;
    a data storage unit for storing recorded voice communications and recorded media content files;
    a line monitoring module for detecting a connected call on a communication line; and
    a processing unit for executing the computer executable instructions to:
        record a voice communication occurring over the communication line being monitored in response to detecting the connected call has connected over the communication line, producing a recorded voice communication, wherein the recorded voice communication is a recording of a voice conversation that took place as part of the connected call;
        store the recorded voice communication in the data storage unit, wherein the recorded voice communication was recorded in response to detecting the connected call;
        generate a first user interface that displays a list having a plurality of entries indicating previously recorded voice communications stored in the data storage unit, the list including an entry for the recorded voice communication, along with information relating respectively to each of the plurality of entries;
        enable a user to add notes to a recorded voice communication in a notes column of the first user interface;
        provide a search interface that enables the user to search for a particular recorded voice communication by searching for a user-specified term in the notes column associated with the list of recorded voice communications;
    wherein the first user interface includes a set of options for transmitting a selected recorded voice communication, and wherein the set of options for transmitting the selected recorded voice communication includes sending the selected recorded voice communication to an email address, sending the selected recorded voice communication as a SMS text message, and transferring the selected recorded voice communication to an external memory device locally coupled to the set-top box.

2. The set-top box of claim 1, wherein the processing unit further executes the computer executable instructions to replay a portion of the voice communication over the communication line.

3. The set-top box of claim 1, wherein the processing unit further executes the computer executable instructions to:
    generate a second user interface that displays a list of recorded voicemails along with information relating to each of the recorded voicemails;
    enable the user to add notes to a recorded voicemail in a notes column of the second user interface; and
    provide a search interface on the second user interface that enables the user to search for a particular recorded voicemail by searching for a user-specified term in the notes column associated with the list of recorded voicemails.

4. The set-top box of claim 1, wherein the processing unit further executes the computer executable instructions to store a caller ID associated with a second party of the voice communication.

5. The set-top box of claim 1, wherein the processing unit further executes the computer executable instructions to control a playback of a selected recorded voice communication based on receiving inputs from a remote control device, wherein a same set of buttons on the remote control device are operable to control both the playback of the selected recorded voice communication and a playback of a recorded media content file.

6. The set-top box of claim 1, wherein the processing unit further executes the computer executable instructions to parse the voice communication to enable a user to search for specific terms spoken during the voice communication.

7. The set-top box of claim 1, wherein the processing unit further executes the computer executable instructions to record a voicemail in response to not detecting the connected call on the communication line within a specified period of receiving an incoming call.

8. The set-top box of claim 7, wherein the processing unit further executes the computer executable instructions to transmit the voicemail to a user specified email address.

9. The set-top box of claim 7 wherein the processing unit further executes the computer executable instructions to notify a user of a new voice voicemail.

10. A computer implemented method for recording a voice communication on a set-top box, the computer implemented method comprising:
    monitoring a communication line to detect a connected phone call;
    recording the audio associated with the connected phone call on the communication line being monitored;
    storing the audio in a data storage unit associated with the set-top box, wherein the audio was recorded in response to detecting a connected phone call has connected over the communication line, the audio constituting a recorded voice communication, wherein the recorded voice communication is a recording of a voice conversation that took place as part of the connected call;

generating a first user interface that displays a list of a plurality of recorded voice communications along with information relating to each of the plurality of recorded voice communications, wherein the first user interface includes a set of options for transmitting a selected recorded voice communication of the plurality of recorded voice communications, and wherein the set of options for transmitting the selected recorded voice communication includes sending the selected recorded voice communication to an email address, sending the selected recorded voice communication as a SMS text message, and transferring the selected recorded voice communication to an external memory device locally coupled to the set-top box.

11. The computer implemented method of claim 10, further comprising:
capturing a caller identification associated with the connected phone call; and
storing the caller identification along with the audio in the data storage unit.

12. The computer implemented method of claim 10, further comprising:
monitoring the communication line to determine whether an incoming call is answered within a specified time;
responsive to the a determination that the incoming call is not answered within the specified time, playing a voicemail greeting; and
recording and storing a voicemail message in the data storage unit associated with the set-top box.

13. The computer implemented method of claim 10, further comprising controlling a playback of a selected recorded voice communication based on receiving inputs from a remote control device, wherein a same set of buttons on the remote control device are operable to control both the playback of the selected recorded voice communication and a playback of a recorded media content file.

14. The computer implemented method of claim 10, further comprising decoding a television signal to display a television program on a display unit associated with the set-top box.

* * * * *